UNITED STATES PATENT OFFICE.

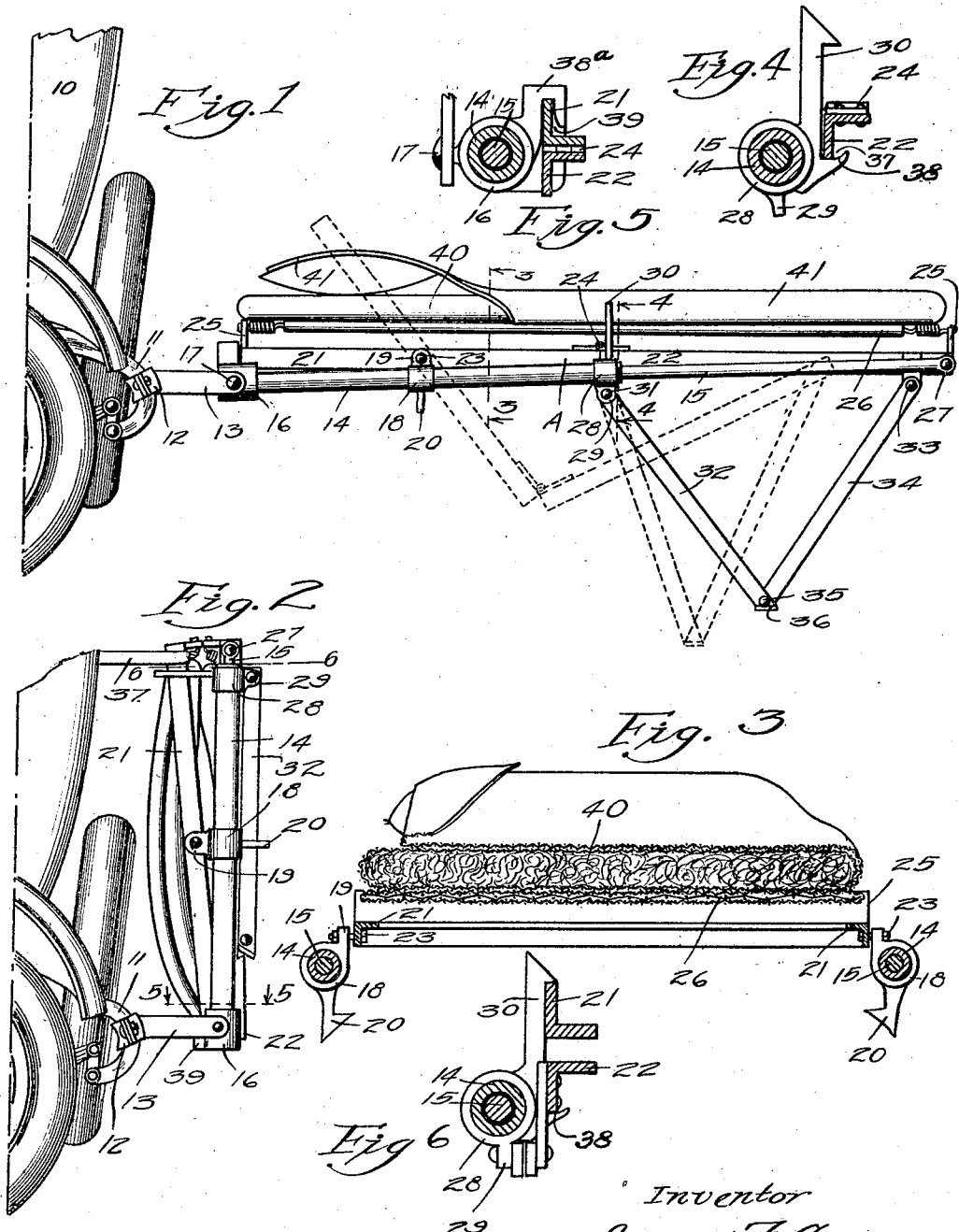

JAMES FRANK COOPER, OF HANNIBAL, MISSOURI.

COLLAPSIBLE AUTOMOBILE BED.

1,418,287. Specification of Letters Patent. Patented June 6, 1922.

Application filed March 4, 1922. Serial No. 541,113.

*To all whom it may concern:*

Be it known that I, JAMES F. COOPER, a citizen of the United States, residing at Hannibal, in the county of Marion and State of Missouri, have invented a certain new and useful Collapsible Automobile Bed, of which the following is a specification.

The object of my invention is to provide a collapsible automobile bed of simple, durable and comparatively inexpensive construction.

This invention relates to the type of automobile bed, illustrated in my United States Letters Patent No. 1,404,930, dated January 31, 1922.

The particular object of my invention is to provide a collapsible bed, wherein the parts will automatically operate for moving them relative to each other when the bed is moved into inoperative position.

Still another object is to provide a telescoping frame secured to an automobile or the like, having a pair of hingedly connected together bed frames mounted thereon and a pair of supporting legs, the parts being so constructed, that when the telescoping frame member is telescoped, one of the bed frame members will swing upon its hinge to position where it will rest against the other bed frame member, while the supporting legs will be moved adjacent to each other for permitting the entire bed and frame to be collapsed for occupying a minimum amount of space.

With these and other objects in view, my invention consists in the construction, arrangement and combination of the various parts, whereby the objects contemplated are attained, as hereinafter more fully set forth, pointed out in my claims, and illustrated in the accompanying drawings, in which:

Figure 1 is a side elevation of my improved collapsible bed, one of the positions being shown in dotted lines.

Figure 2 is a side elevation of the same, the bed being shown in inoperative position.

Figure 3 is a central, sectional view taken on the line 3—3 of Figure 1.

Figure 4 is a detail, sectional view taken on the line 4—4 of Figure 1.

Figure 5 is a sectional view taken on the line 5—5 of Figure 2; and

Figure 6 is a sectional view taken on the line 6—6 of Figure 2.

In the accompanying drawings, I have used the reference numeral 10 to indicate generally an automobile body, which is supported on the frame 11.

My improved collapsible bed is designed to be secured to the frame 11, and for so securing the bed to the frame, I provide a pair of clamping members 12, which are provided with rearwardly extending brackets 13. The clamping members 12 are each secured to the frame members 11.

My improved collapsible bed includes a telescoping frame member, consisting of a tubular member 14, having a rod 15 capable of sliding movement therein. A casting 16 is secured to the forward end of the member 14, which casting is provided with a stub shaft 17, which is extended through the bracket 13.

From the construction of the parts just described, it will be seen that the telescoping frame members are capable of pivotal movement relative to the brackets 13. On the member 14 is a telescoping frame.

On each of the members 14 of the telescoping frame members, I provide a collar 18. Each of the collars 18 are provided with upwardly extending ears 19 and downwardly extending hook portions 20.

I provide a two-part bed frame A, consisting of angle iron frames 21 and 22. The member 21 is pivotally connected by means of the bolts 23 to the ears 19 on the collars 18, as clearly illustrated in Figure 3 of the drawings.

The abutting edges of the two-part bed frame A are connected together by means of the hinges 24. End pieces 25 are used for connecting the free ends of the bed frames 21 and 22.

An ordinary bed spring 26 is fastened to each of the end pieces 25, as clearly illustrated in Figure 5 of the drawings.

The rear end of the member 15 of the telescoping frame is pivotally secured to the rear end of the bed frame 22 by means of a bolt or the like 27.

From the construction of the parts just described, it will be seen that the bolts 23 and 27 form the connection between the telescoping frame members and the two-part bed frame member.

Fixed to the rear end of the member 14 of the telescoping frame is a collar 28, having a downwardly extending ear 29 thereon, and an upwardly extending hook member 30.

Fixed to the ear 29 by means of the pivot 31 is a supporting leg 32. Fixed to the bed frame 22 by means of the pivot 33 is a leg 34. The lower ends of the legs 32 and 34 are pivotally connected together by means of a bolt or the like 35.

Each of the lower ends of the legs 32 and 34 are slightly bent as at 36, so as to provide a flat portion for resting upon the ground, and for forming a better footing for the legs 32 and 34.

In order to form a support for the center of the bed frame A adjacent to the hinge member 24, I form a notch 37 on the hook member 30. The inner surface of the notch 37 is beveled as at 38.

The bed frame A is capable of being sprung a sufficient amount, so that it will pass up along the beveled surface 38 and then spring into the notch 37. The notch 37 forms a support for the bed frame member 22 and prevents any hinged movement, when not desired.

From the construction of the parts just described, it will be seen that the bed frame is practically supported on each side by three different supporting means, thus holding the bed frame in proper position when it is desired to be used.

The springing inward of the bed frame members adjacent to the hinge 24 will cause them to be released from the notch 37 and permit the operation of the hinge 24.

The pushing of the rods 15 of the collapsible frame member into the tubular members 14 will cause the center of the bed to be moved downwardly, and the supporting legs 32 and 34 to be moved closer together, as clearly illustrated by the dotted lines in Figure 1 of the drawings.

The continued movement of the rod 15 into the tubular member 14 will cause the bed frame member 21 to be swung upon the bed frame member 22 and the legs 32 and 34 to be brought adjacent to each other until the pivots 31 and 33 are in alignment with each other, so that the legs 32 and 34 may be swung in unison.

After the bed frame has been closed and the telescoping frame telescoped, the entire structure may be swung upon the stub shafts 17 and the parts moved to position shown in Figure 2 of the drawings.

When the parts are moved to position shown in Figure 2 of the drawings, the legs 32 and 34 may be sprung a sufficient amount, so that they will pass over the hooks 20 and be held against any undesired pivotal movement by means of the hooks 20.

The hook member 30 on the collar 28 will engage the free end of the bed frames 21 and 22 and hold them against movement.

The parts are resilient enough to permit the slight amount of springing movement necessary to cause the parts to be engaged by the various hooks.

After the entire bed has been moved to the position shown in Figure 2 of the drawings, an ordinary belt 37 may be employed for fastening the entire structure to the back of the automobile.

In order to prevent rattling of the parts, I provide a portion 38$^a$ on the casting 16, which receives the hinged ends of the bed frame members 21 and 22. One part of the angle iron frame is received within a notch 39 formed in the portion 38$^a$, as clearly illustrated in Figure 5 of the drawings.

The arrangement of the parts just described will prevent any sideward movement of the bed frame members and thus eliminates any great amount of "rattle."

Resting upon the bed spring 26 is an ordinary mattress 40 and the blankets 41. When the bed frame is collapsed, the blankets and mattress will be received between the bed spring, and thus the entire bed may be easily folded up, and when unfolded will be ready for use.

In the practical operation of my collapsible bed, the parts are first moved from position shown in Figure 2 of the drawings, by swinging the entire structure upon the stub shaft 17. The hook member 30 is released, so as to permit the bed frame members to swing upon their hinge connection.

The pulling of the rod 15 from within the tubular member 14 of the collapsible frame will cause the legs 32 and 34 to be spread apart and the bed moved to horizontal position where it may be used.

The bed frame will swing up against the inclined surface 38 and then be received in the notch 39 for rigidly holding three points of the bed frame.

The forward portion of the bed frame need not be supported, due to the fact that the bed frame is properly supported at three different points.

The hinge 24 prevents any possible buckling or upward movement of the bed frame member, while the notch 37 prevents any movement in the other direction.

It will be seen that my collapsible bed may be easily operated and is practically automatic for causing the various parts to be moved to their various positions, when the bed is not desired to be used.

Some changes may be made in the arrangement and construction of the various parts of my device, without departing from the essential features and purposes of my invention, and it is my intention to cover by my claims, any modified forms of structure, or use of mechanical equivalents, which may be reasonably included within their scope.

I claim as my invention:

1. In a device of the class described adapted to be used in combination with an automobile or the like including a telescoping frame member secured at one end to the automobile, a two part bed frame hingedly connected together at their abutting edges, one part of said bed frame being pivotally supported on said telescoping frame member, the other part of said bed frame being pivoted at one end to one end of said telescoping frame member, a pair of supporting legs pivotally secured to said telescoping frame member and to said bed frame, the parts being so arranged that the telescoping of said telescoping frame member will cause one part of the bed frame to be swung over the other part of the bed frame and cause said pair of supporting legs to be moved adjacent to each other whereby the entire bed may be swung to position along the back of the automobile for the purposes stated.

2. In a device of the class described adapted to be used in combination with an automobile or the like including a pair of telescoping frame members pivotally secured at one end to and supported on the automobile, a two part bed frame hingedly connected together at their abutting edges, means for pivotally mounting one part of said bed frame substantially midway between its ends on one part of the telescoping frame member, the other part of said bed frame being pivoted to one end of the telescoping frame member and means for supporting said telescoping frame member, the parts being so arranged that the telescoping of said telescoping frame member will cause one part of the bed frame to be swung over the other part of the bed frame, whereby the entire bed may be swung to position along the back of the automobile for the purposes stated.

3. In a device of the class described adapted to be used in combination with an automobile or the like including a telescoping frame member secured at one end to the automobile, a two part bed frame hingedly connected together at their abutting edges, one part of said bed frame being pivotally supported on said telescoping frame member, the other part of said bed frame being pivoted at one end to one end of said telescoping frame member, a pair of supporting legs pivotally connected together at their lower ends and having their upper ends pivotally secured to said telescoping frame member and to said bed frame, the parts being so arranged that the telescoping of said telescoping frame member will cause one part of the bed frame to be swung over the other part of the bed frame and cause said pair of supporting legs to be moved adjacent to each other whereby the entire bed may be swung to position along the back of the automobile for the purposes stated.

4. In a device of the class described adapted to be used in combination with an automobile or the like including a telescoping frame member secured at one end to the automobile, a two part bed frame hingedly connected together at their abutting edges, one part of said bed frame being pivotally supported on said telescoping frame member, the other part of said bed frame being pivoted at one end to one end of said telescoping frame member, a pair of supporting legs pivotally connected together at their lower ends and having their upper ends pivotally secured to said telescoping frame member and to said bed frame, the parts being so arranged that the telescoping of said telescoping frame member will cause one part of the bed frame to be swung over the other part of the bed frame and cause said pair of supporting legs to be moved adjacent to each other whereby the entire bed may be swung to position along the back of the automobile and a latch member for engaging said supporting legs for holding them in their inoperative position, for the purposes stated.

5. In a device of the class described a two part telescoping frame member, a two part bed frame hingedly connected together, means for pivotally connecting and supporting each part of the bed frame on each part of the telescoping frame, supporting legs for said device, said supporting legs being pivotally connected to one part of the bed frame and one part of telescoping frame member, the parts being so arranged that the telescoping of said telescoping frame member will cause one part of the bed frame to be swung over the other part thereof and to cause said supporting legs to be moved adjacent to each other as specified.

6. In a device of the class described a two part telescoping frame member, a two part bed frame hingedly connected together, means for pivotally connecting and supporting each part of the bed frame on each part of the telescoping frame, supporting legs for said device, said supporting legs being pivotally connected to one part of the bed frame and one part of telescoping frame member, the parts being so arranged that the telescoping of said telescoping frame member will cause one part of the bed frame to be swung over the other part thereof and to cause said supporting legs to be moved adjacent to each other, and means on said telescoping frame member adapted to engage said bed frame for preventing any undesired telescoping movement of said telescoping frame member while it is in position as a bed.

7. In a device of the class described a two part telescoping frame member, a two part bed frame hingedly connected together, means for pivotally connecting and supporting each part of the bed frame on each part of the telescoping frame, supporting legs for said device, said supporting legs being pivotally connected to one part of the bed frame and one part of telescoping frame member, and having their lower ends pivotally connected together, the parts being so arranged that the telescoping of said telescoping frame member will cause one part of the bed frame to be swung over the other part thereof and to cause said supporting legs to be moved adjacent to each other whereby the pivotal connections with the bed frame and with the telescoping frame member will be brought in substantial alinement.

Des Moines, Iowa, February 21, 1922.

JAMES FRANK COOPER.